(12) United States Patent
Ono et al.

(10) Patent No.: US 9,166,804 B2
(45) Date of Patent: Oct. 20, 2015

(54) PACKET TRANSMISSION CONTROL DEVICE, PACKET TRANSMISSION CONTROL METHOD, AND PROGRAM

(75) Inventors: Tomoyuki Ono, Saitama (JP); Tatsuaki Yukawa, Kanagawa (JP); Atsushi Maruyama, Tokyo (JP); Seishi Tomonaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 134 days.

(21) Appl. No.: 13/818,568

(22) PCT Filed: Aug. 22, 2011

(86) PCT No.: PCT/JP2011/068852
§ 371 (c)(1),
(2), (4) Date: Feb. 22, 2013

(87) PCT Pub. No.: WO2012/029575
PCT Pub. Date: Mar. 8, 2012

(65) Prior Publication Data
US 2013/0156034 A1    Jun. 20, 2013

(30) Foreign Application Priority Data
Aug. 30, 2010   (JP) .................................. 2010-192250

(51) Int. Cl.
*H04L 12/18*      (2006.01)
*H04L 12/801*     (2013.01)

(52) U.S. Cl.
CPC ............ *H04L 12/18* (2013.01); *H04L 12/1886* (2013.01); *H04L 47/15* (2013.01)

(58) Field of Classification Search
None
See application file for complete search history.

(56) References Cited

U.S. PATENT DOCUMENTS

| 6,247,058 | B1* | 6/2001 | Miller et al. .................. 709/234 |
| 7,822,018 | B2* | 10/2010 | Williams et al. ............. 370/352 |
| 2003/0103243 | A1* | 6/2003 | Watanabe et al. ............. 358/405 |
| 2005/0232147 | A1* | 10/2005 | Bang et al. .................... 370/229 |
| 2009/0180448 | A1* | 7/2009 | Kobayashi .................... 370/338 |
| 2010/0085980 | A1* | 4/2010 | Hinosugi et al. ............. 370/412 |

FOREIGN PATENT DOCUMENTS

| JP | 2001-211207 | 8/2001 |
| JP | 2008-199540 | 8/2008 |

OTHER PUBLICATIONS

Kurosawa et al., "A Study of QoS-Guaranteed Multicast Equipment," IEICE Technical Report, NS2008-63 (Sep. 2008) pp. 121-124. (13 pages).

* cited by examiner

*Primary Examiner* — Hassan Kizou
*Assistant Examiner* — Hashim Bhatti
(74) *Attorney, Agent, or Firm* — Sony Corporation

(57) ABSTRACT

There is provided a packet transmission control device including a packet interval adjustment unit that adjusts packet intervals of a plurality of packets, a packet replication unit that replicates the plurality of packets whose packet intervals are adjusted by the packet interval adjustment unit to generate a plurality of packet groups, and a destination assignment unit that assigns different destination information pieces to the respective plurality of packet groups generated by the packet replication unit.

10 Claims, 15 Drawing Sheets

FIG. 9

| No. | DESTINATION |
|---|---|
| 1 | DESTINATION A |
| 2 | DESTINATION B |
| 3 | DESTINATION C |
| 4 | DESTINATION D |

FIG. 10

| No. | DESTINATION |
|---|---|
| 1 | DESTINATION A |
| 2 | DESTINATION D |

FIG. 12

(UNIT : %)

| NUMBER OF FLOWS | DISTRIBUTION SERVER100 | | | RELATED ART | | |
|---|---|---|---|---|---|---|
| | usr | sys | idle | usr | sys | idle |
| 50 | 0.00 | 3.79 | 96.14 | 1.00 | 6.57 | 92.07 |
| 100 | 0.14 | 7.50 | 92.21 | 2.86 | 30.36 | 66.86 |
| 150 | 0.00 | 11.36 | 88.50 | 3.79 | 75.93 | 20.21 |
| 200 | 0.00 | 15.50 | 84.36 | 2.86 | 81.07 | 16.07 |

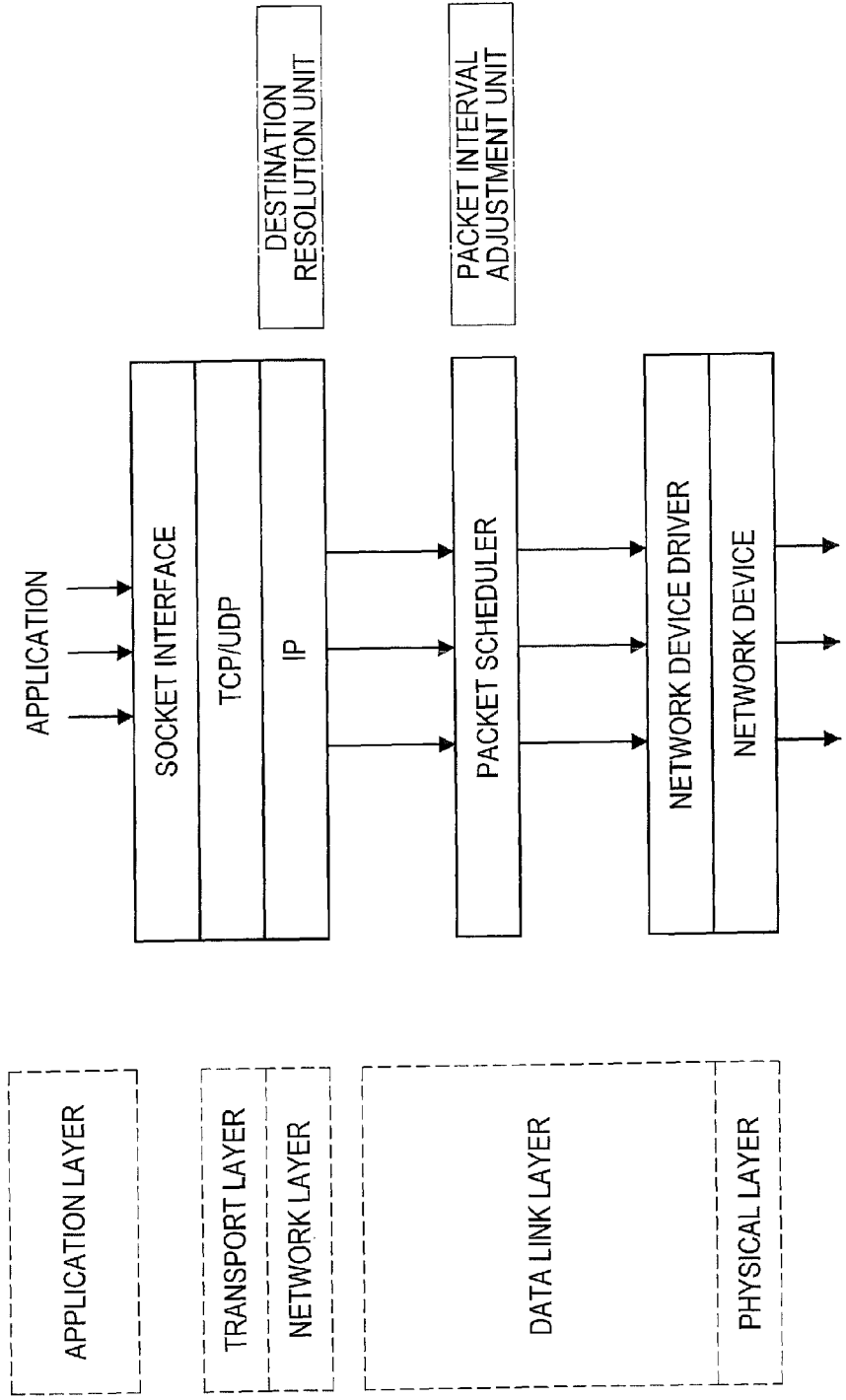

PACKET TRANSMISSION CONTROL DEVICE, PACKET TRANSMISSION CONTROL METHOD, AND PROGRAM

CROSS REFERENCES TO RELATED APPLICATIONS

The present application is a national stage of International Application No. PCT/JP2011/068852 filed on Aug. 22, 2011 and claims priority to Japanese Patent Application No. 2010-192250 filed on Aug. 30, 2010, the disclosure of which is incorporated herein by reference.

BACKGROUND

The present invention relates to a packet transmission control device, a packet transmission control method, and a program, and particularly to a packet transmission control device, a packet transmission control method, and a program for distributing the same data to a plurality of destinations.

Recently, as information communication networks are developing, various kinds of content have come to be distributed through communication networks. Particularly, when content such as video having a large amount of data capacity and a high real-time property is to be distributed, it is important to secure a network band.

When the same data is distributed to a plurality of destinations, a distribution server generally transmits data obtained in such a way that data is copied for each destination and then packetized to each destination. In this case, packet groups corresponding to the number of destinations are sent to a network. For this reason, as the number of destinations increases, a load imposed on a network increases. Thus, the distribution server intends to reduce a network load by adjusting the timing at which each packet included in the packet groups is transferred to the network using traffic shaping (for example, Patent Literature 1).

In addition, there is multicast as a technique for reducing network load when the same data is distributed to a plurality of specific destinations (for example, Patent Literature 2). Multicast is a technique of lowering network traffic by simultaneously distributing information in a single stream to a plurality of destinations.

CITATION LIST

Patent Literature

Patent Literature 1: JP 2001-211207A
Patent Literature 2: JP 2008-199540A

SUMMARY

Technical Problem

However, there are problems that a network having the function of multicast is very expensive, and initial cost is necessary. In addition, there is another problem that, when multicast is not used, traffic shaping processes are performed for each of packet groups to be transferred to each destination, and thus the traffic shaping processes corresponding to the number of destinations are necessary, which causes a heavy load on the CPU of a content distribution server.

Therefore, the present disclosure proposes provision of novel and improved packet transmission control device, packet transmission control method, and program which enable a reduction in a processing load caused by traffic shaping on a content distribution server that transmits the same data to a plurality of destinations.

Solution to Problem

According to an embodiment of the present disclosure, there is provided a packet transmission control device including a packet interval adjustment unit that adjusts packet intervals of a plurality of packets, a packet replication unit that replicates the plurality of packets whose packet intervals are adjusted by the packet interval adjustment unit to generate a plurality of packet groups, and a destination assignment unit that assigns different destination information pieces to the respective plurality of packet groups generated by the packet replication unit.

According to the configuration, in a packet transmission control device that distributes the same data to a plurality of destinations, after the packet intervals of a plurality of packets included in one packet group are adjusted, each of the packets is replicated. Since the time taken for replication is generally shorter than the time for a transferring process, replicated packets are transferred in connection with original packets that are replication sources. For this reason, the replicated packets are transferred at the same interval as the original packets. Thus, in the packet transmission control device that distributes the same data to a plurality of destinations, the packet intervals of replicated packets can also be adjusted by performing only one adjustment process of the packet intervals (a so-called traffic shaping process) for original packets. Thus, it is possible to dramatically reduce processing load caused by a packet interval adjustment process.

Further, the packet transmission control device may further include a destination management unit that retains destination management information in which destination information pieces are described, by the destination assignment unit, in order of being assigned to the packet groups. The packet replication unit replicates a number of packet groups corresponding to a number of destination information pieces described in the destination management information retained by the destination management unit. The destination assignment unit assigns, to the packet groups, the destination information pieces described in the destination management information in order of being described in the destination management information.

Further, the destination management unit may limit the number of destination information pieces that are deleted to be lower than or equal to a predetermined number in accordance with a deletion request for the destination information pieces described in the destination management information.

Further, the destination management unit may delete the destination information pieces in order of being described closer to an end of the destination management information.

Further, the destination management unit may add a destination information piece to an end of the destination management information in accordance with an addition request of the destination information piece to the destination management information.

Further, the packet transmission control device further may include a destination resolution unit that decides a communication interface that sends the packets based on the destination information piece assigned to the packets by the destination assignment unit.

Further, the packet transmission control device may further include a reception unit that receives packets via a network, and a buffer unit that temporarily stores the packets received by the reception unit. The packet interval adjustment unit adjusts packet intervals of packets acquired from the buffer unit.

Further, according to an embodiment of the present disclosure, there is provided a packet transmission control method including adjusting packet intervals of a plurality of packets, replicating the plurality of packets whose packet intervals are adjusted in the step of adjusting the packet intervals to generate a plurality of packet groups, and assigning different destination information pieces to the respective plurality of generated packet groups.

Further, according to an embodiment of the present disclosure, there is provided a program for causing a computer to function as a packet replication unit that replicates a plurality of packets whose packet intervals are adjusted in advance to generate a plurality of packet groups, and a destination assignment unit that assigns different destination information pieces to the respective plurality of packet groups generated by the packet replication unit.

Advantageous Effects of Invention

According to the present disclosure as described above, it is possible to reduce a processing load caused by a traffic shaping process on a content distribution server that transmits the same data to a plurality of destinations.

Additional features and advantages are described herein, and will be apparent from the following Detailed Description and the figures.

BRIEF DESCRIPTION OF THE FIGURES

FIG. 9 is a table showing an example of destination management information.

FIG. 10 is a table showing an example of destination management information after deletion of destinations.

FIG. 12 is a table showing an effectiveness confirmation test result of an information process according to the embodiment.

FIG. 16 is an illustrative diagram showing a network layer structure of an information processing device of the related art.

DETAILED DESCRIPTION

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Note that description will be provided in the following order.
1. First Embodiment
1-1. Overview
1-2. Functional Configuration
1-3. Packet Transfer Operation
1-4. Destination Management
1-5. Example of Effect
2. Second Embodiment (Multi-Stage Configuration)

1. First Embodiment

[1-1. Overview]

First, the overview of a content distribution system according to a first embodiment of the present disclosure will be described with reference to FIGS. 1 to 5 and FIGS. 14 and 15.

Figure 1:
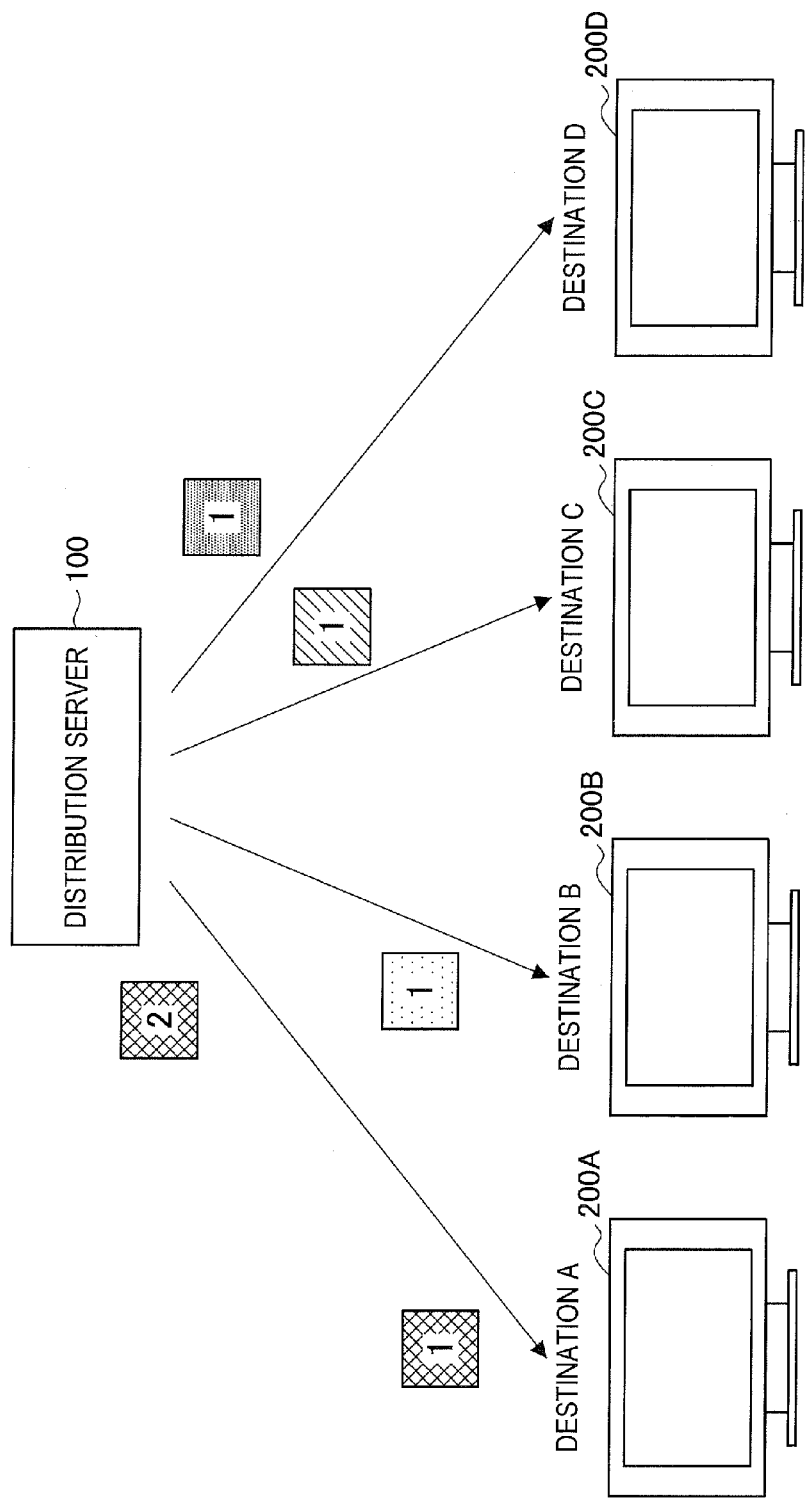
FIG. 1 is a configuration diagram of an information processing system according to a first embodiment of the present disclosure.
Figure 2:
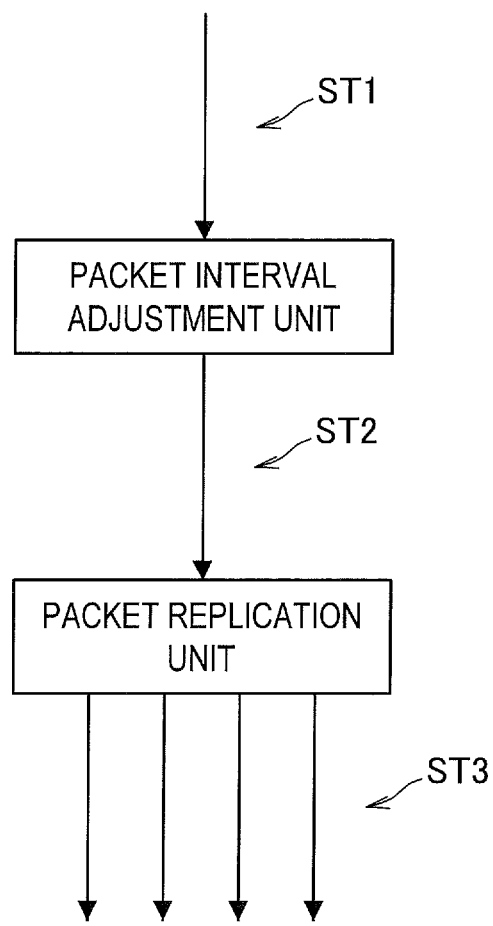
FIG. 2 is an illustrative diagram showing the overview of packet interval adjustment of an information processing device according to the embodiment.
Figure 3:
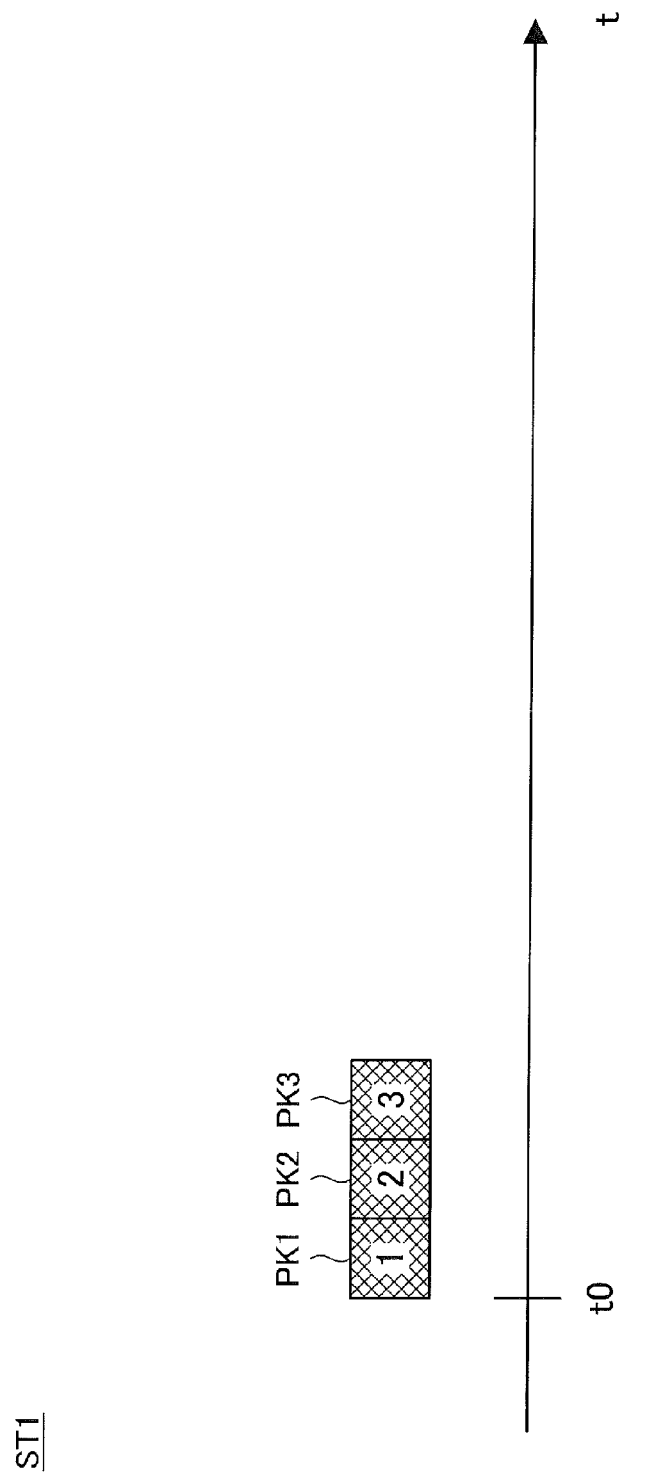
FIG. 3 is an illustrative diagram showing an example of packet intervals in the state of ST1 of FIG. 2.
Figure 4:
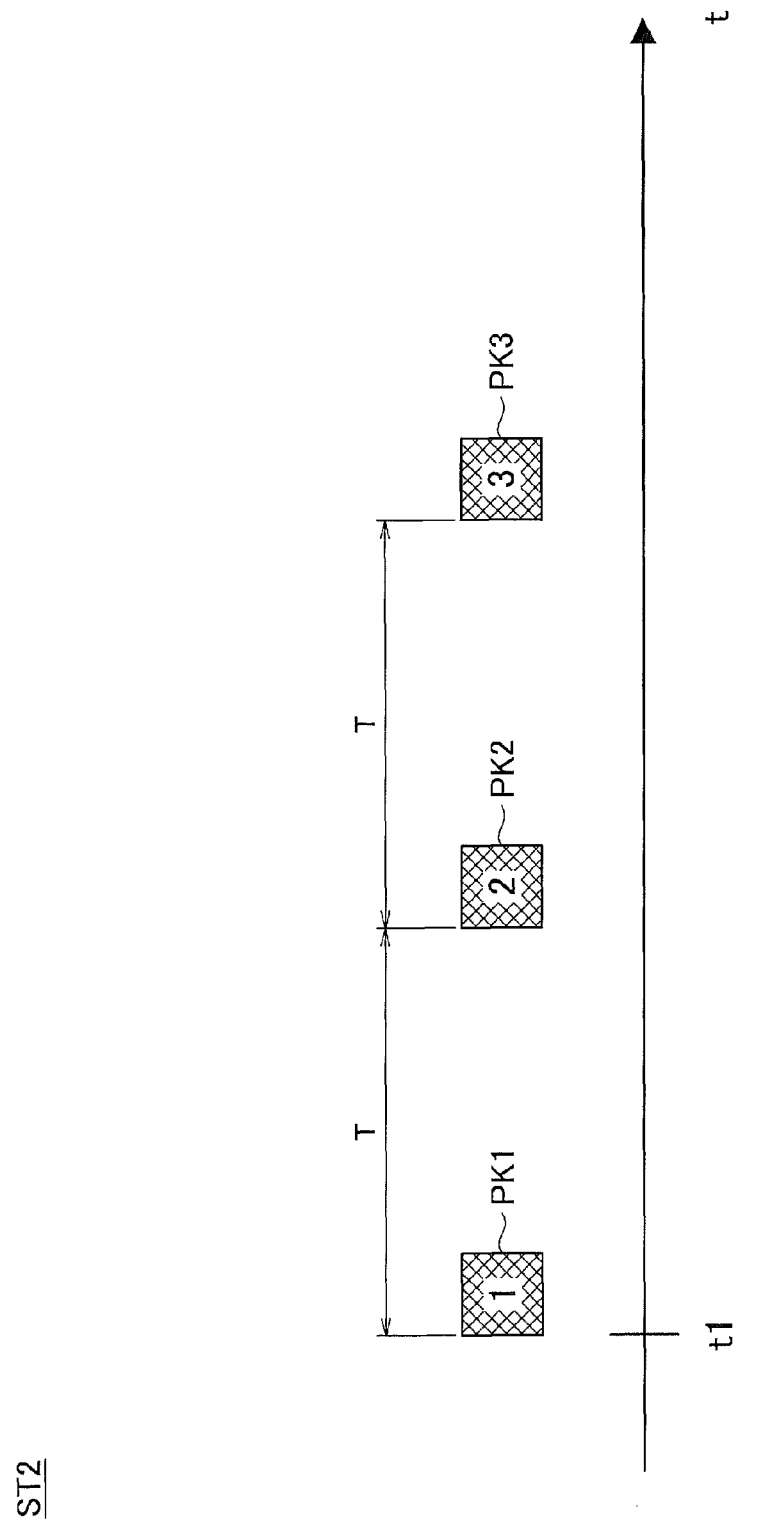
FIG. 4 is an illustrative diagram showing an example of packet intervals in the state of ST2 of FIG. 2.
Figure 5:
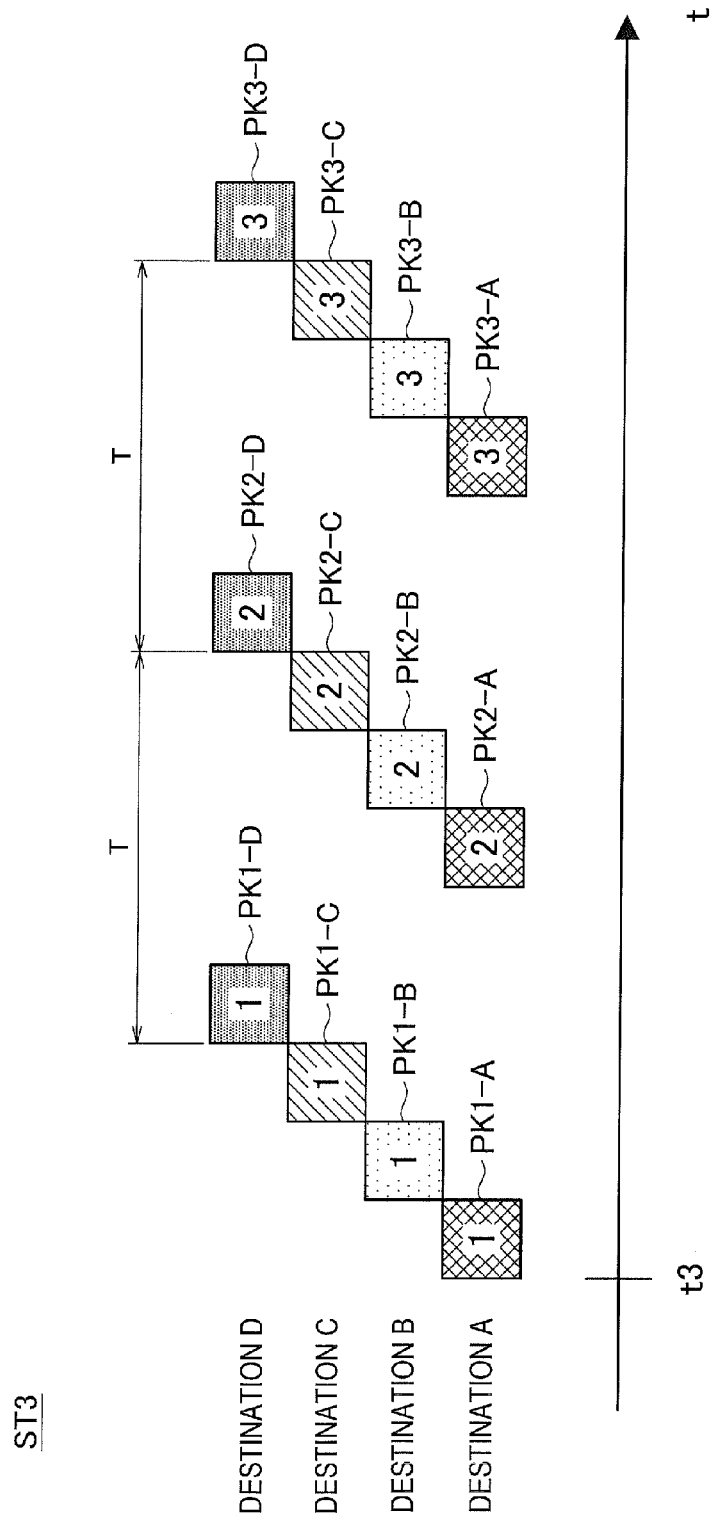
FIG. 5 is an illustrative diagram showing an example of packet intervals in the state of ST3 of FIG. 2.
Figure 14:
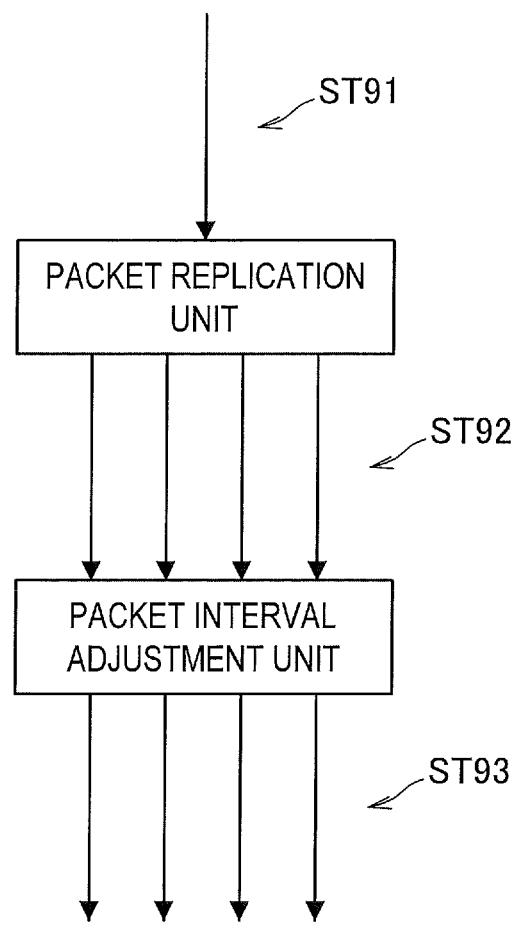
FIG. 14 is an illustrative diagram showing the overview of packet interval adjustment of the related art.
Figure 15:
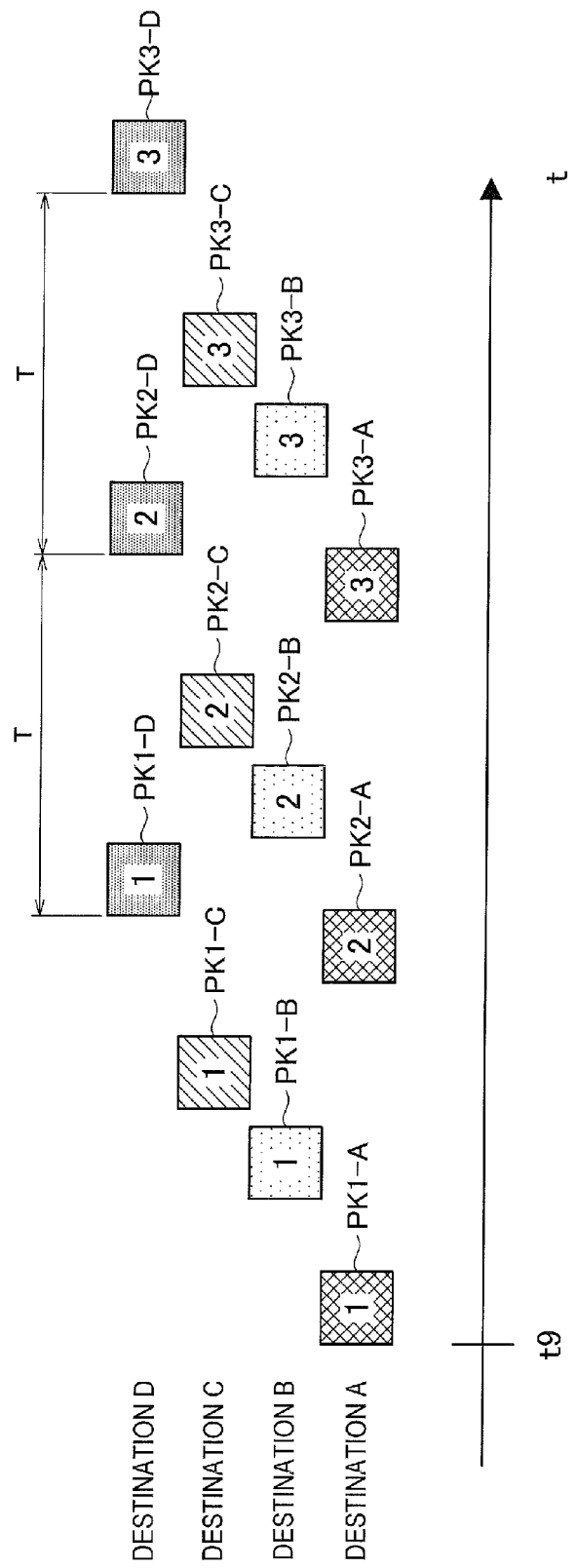
FIG. 15 is an illustrative diagram showing an example of packet intervals in the state of ST93 of FIG. 14.

FIG. 1 is a configuration diagram of an information processing system according to the first embodiment of the present disclosure. FIG. 2 is an illustrative diagram showing the overview of packet interval adjustment of an information processing device according to the embodiment. FIG. 3 is an illustrative diagram showing an example of packet intervals in the state of ST1 of FIG. 2. FIG. 4 is an illustrative diagram showing an example of packet intervals in the state of ST2 of FIG. 2. FIG. 5 is an illustrative diagram showing an example of packet intervals in the state of ST3 of FIG. 2. In addition, FIG. 14 is an illustrative diagram showing the overview of packet interval adjustment of the related art. FIG. 15 is an illustrative diagram showing an example of packet intervals in the state of ST93 of FIG. 14.

In the content distribution system according to the first embodiment of the present disclosure, a distribution server 100 packetizes the same content data and sequentially transmits the resultant data to a plurality of destination terminals 200. At this moment, the distribution server 100 generates each packet to be transferred to each of the destination terminals 200 by replicating the original packet and sends the packets to a network. The destination terminals 200 are terminal devices that receive content distributed from the distribution server 100. For the destination terminals 200, it is assumed herein that there are four destination terminals 200 including a destination terminal 200A, a destination terminal 200B, a destination terminal 200C and a destination terminal 200D, but the disclosure is not limited thereto. The destination terminal 200 is configured to include one or more devices, and a number of devices of which the number can correspond to the system configuration may be connected to each other.

In this case, the distribution server 100 has a function of traffic shaping for adjusting an interval of packets to be transferred to a network. In the related art, a packet replication unit first replicates each of packet groups of content corresponding to the number of destinations and generates a plurality of packet groups, as shown in FIG. 14. Then, a packet interval adjustment unit performs traffic shaping processes for each of the packet groups. Herein, a packet group is, for example, a plurality of packets generated from certain content, and a series of packets to be transferred to the same destination.

For this reason, in the related art, packet groups corresponding to the number of destinations are generated in the state shown in ST92 after packet replication. Then, for each of the packet groups, the packet interval adjustment unit performs traffic shaping processes. Thus, processing load caused by the traffic shaping processes corresponding to the number of destination terminals 200 is imposed on a distribution server 900 of the related art.

In order to reduce the processing load caused by the traffic shaping processes, the distribution server 100 according to the present embodiment adjusts the packet intervals of original packets before packet replication as shown in FIG. 2. With this configuration, a traffic shaping process is performed for one data flow of the original packets, the packet intervals are adjusted, and then, replication of the packets is performed. For this reason, the traffic shaping process may be performed once only for the original packets.

FIG. 3 shows an example of the state indicated by ST1 in FIG. 2, that is, the state of packets when the packets are input to a packet interval adjustment unit. For example, packets included in a packet group are input to the packet interval adjustment unit in a state of being connected to each other. Then, the packets output from the packet interval adjustment unit are output from the packet interval adjustment unit at every predetermined time interval T as shown in, for example, FIG. 4. Herein, FIG. 4 shows the times at which packets PK2 and PK3 are output from the packet interval adjustment unit when the time at which a packet PK1 is output from the packet interval adjustment unit is set to be t1. The packets input to a packet replication unit without change as shown in FIG. 4 are replicated by the packet replication unit and then output as shown in FIG. 5.

In FIG. 5, PK1 is a first packet out of packets generated by dividing one content data, and PK1-A is a packet that is one of the packets to be transferred to a destination A. First, the packet replication unit replicates PK1 so as to output packets to be transferred to four destinations of destinations A to D. In this case, generally, replication of a next packet is completed before transfer of the first packet is completed. In other words, a packet PK1-B is replicated before transfer of the packet PK1-A is completed. For this reason, each of the packets is transferred while connected in the order of replication as shown in FIG. 5.

Finally, by making the order of assigning destinations to packets the same each time, it is possible to make the order of destinations to which packets are transferred the same. Then, as a result, to focus on the packets of each destination, the packets are transferred at substantially the same fixed time interval T as all of the original packets.

On the other hand, in the distribution server 900 of the related art, after packets are replicated, traffic shaping processes are performed for each data stream to each destination. For this reason, there is no correlation of packet transfer timings between the packets in data flows. For example, an example of a state of packets output from the packet interval adjustment unit is shown in FIG. 15.

Hereinabove, the overview of the content distribution system according to the present embodiment has been described. In the distribution server 900 of the related art, after packets of content are replicated to be packets for each destination, each traffic shaping process is performed for each data flow. For this reason, the traffic shaping processes corresponding to the number of destinations to which content is distributed are necessary, and when a CPU load on the distribution server 900 is heavy and content is to be distributed to a number of destinations, hardware performance corresponding to the situation is necessary. On the other hand, the distribution server 100 proposed herein may perform one traffic shaping process even when content is to be distributed to a plurality of destinations. For this reason, it is possible to dramatically reduce processing load caused by the traffic shaping process.

A specific configuration of the distribution server 100 for realizing the above function will be described next.

[1-2. Functional Configuration]

Next, with reference to FIG. 6, a functional configuration of the distribution server 100 according to the present embodiment will be described. The distribution server 100 is a server that distributes data such as content to the plurality of destination terminals 200, and an example of a packet transmission control device. The distribution server 100 mainly includes a packetization unit 103, the packet interval adjustment unit 105, the packet replication unit 107, a destination resolution unit 109, a communication interface unit 111, a destination management unit 113, and a storage unit 115.

The packetization unit 103 has a function of dividing content data of content to be distributed to the destination terminals 200 by the distribution server 100 and generates a series of packet groups to be transmitted to the same destinations. In FIG. 6, the packetization unit 103 is assumed to packetize content data stored in the storage unit 115, but the disclosure is not limited thereto. The packetizing unit may acquire content data stored in an external device to packetize it.

The packet interval adjustment unit 105 has a function of adjusting packet intervals between a plurality of packets which are generated by dividing content data and included in packet groups to be transmitted to the same destination. The packet interval adjustment unit 105 typically adjusts packet intervals to uniform intervals. The packet intervals are decided so that the band of a network 300 can be effectively used. The packet interval adjustment unit 105 inputs packets whose packet interval is adjusted to the packet replication unit 107. Herein, the packets input to the packet replication unit 107 may be called original packets in a sense of being source packets to be replicated.

The packet replication unit 107 has a function of replicating each of the packets input from the packet interval adjustment unit 105 so as to generate packets corresponding to the number of the destination terminals 200. At this moment, the packet replication unit 107 replicates packets corresponding to the number of destination information pieces described in destination management information retained in the destination management unit 113. When, for example, destination information pieces corresponding to 100 terminals are described in the destination management information, the packet replication unit 107 replicates 99 packets so as to generate 100 packets including the original packet, in other words, packets corresponding to the number of destination terminals 200. Note that the packet replication unit 107 in the present embodiment also has a function of a destination assignment unit. The packet replication unit 107 adds the destination information pieces to each of the generated packets so as to output them to the destination resolution unit 109. At this moment, the packet replication unit 107 adds the destination information pieces to the packets in the order described in the destination management information retained in the destination management unit 113. In other words, the destination information pieces are respectively added to the packets generated after replicating each packets included in the packet groups in the same order.

It is assumed that, for example, three packets, which are a packet PK1, a packet PK2, and a packet PK3 are included in a packet group. In this case, when the packet PK1 is first replicated and then four packets are generated, the packet replication unit 107 adds destination information pieces to the four packets in the order of the destinations A, B, C, and D. In this case, to four packets generated by replicating the packet PK2, the packet replication unit 107 adds the destination information pieces in the same order of the destinations A, B, C, and D. The same applies to the packet PK3. By adding the destination information pieces in the same order every time in this manner, focusing on a packet group to be transferred to the same destination, as a result, the packet intervals of respective packets included in the packet group are the same as those of the original packets.

The destination resolution unit 109 has a function of selecting the communication interface unit 111 that sends packets received from the packet replication unit 107 to the network. Note that, in FIG. 6, only one communication interface unit 111 is shown, but the distribution server 100 may actually have a plurality of communication interface units 111. The destination resolution unit 109 selects the communication interface unit 111 based on destination information of each packet.

The communication interface unit 111 is a communication interface connected to the network 300. The communication interface unit 111 has functions of, for example, a transmission unit that sends packets received from the destination resolution unit 109 to the network 300 and a reception unit that receives various kinds of information from the network 300. The communication interface unit 111 can, for example, receive requests of adding and deleting destination information from the destination terminals 200, and the like via the network 300.

The destination management unit 113 has a function of managing information of destinations to which the distribution server 100 distributes content. The destination management unit 113 manages the destination information by retaining destination management information in which the destination information is described in the order that the packet replication unit 107 gives to packet groups. In addition, the destination management unit 113 can delete destination information in accordance with a deletion request on the destination information described in the destination management information and add destination information to the destination management information in accordance with an addition request of a distribution destination. At this moment, it is preferable that the destination management unit 113 edit the destination information so as not to affect traffic generated until each packet reaches the destination terminals 200. For this reason, it is preferable that the destination management unit 113 performs addition or deletion of the destination information so that a change in intervals between each packet included in a series of packets caused by editing the destination information is shorter than or equal to a predetermined time length. Details of editing of the destination information by the destination management unit 113 will be described later.

The storage unit 115 has a function of storing data, and can include a storage medium, a recording device that records data on a storage medium, a read-out device that reads out data from a storage medium, a deleting device that deletes data recorded on a storage medium, or the like. Herein, as a storage medium, for example, a flash memory, an HDD (Hard Disk Drive), an EEPROM (Electronically Erasable and Programmable Read Only Memory), an MRAM (Magnetoresistive Random Access Memory), an FeRAM (Ferroelectric Random Access Memory), a PRAM (Phase Change Random Access Memory), and the like can be exemplified, but the medium is not limited thereto. In the present embodiment, the storage unit 115 stores content data of content that the distribution server 100 distributes and destination management information including information of destinations that serve as distribution destinations.

Hereinabove, the example of the function of the distribution server 100 according to the present embodiment has been described. Each of constituent elements described above may be configured using general-purpose members or circuits, and may also be configured with hardware specialized in the functions of the constituent elements. In addition, all the functions of the constituent elements may be performed by a CPU, or the like. Thus, it is possible to appropriately modify a configuration to be used according to technical levels whenever the present embodiment is implemented.

Note that it is possible to produce a computer program for realizing each function of the distribution server 100 according to the present embodiment as described above, and to install the program in a device such as a server. In addition, it is also possible to provide a computer-readable recording medium on which such a computer program is stored. Such a recording medium is, for example, a magnetic disk, an optical disc, a magneto-optical disc, a flash memory, or the like. In addition, such a computer program as described above may be distributed via, for example, a network without using a recording medium.

Figure 6:
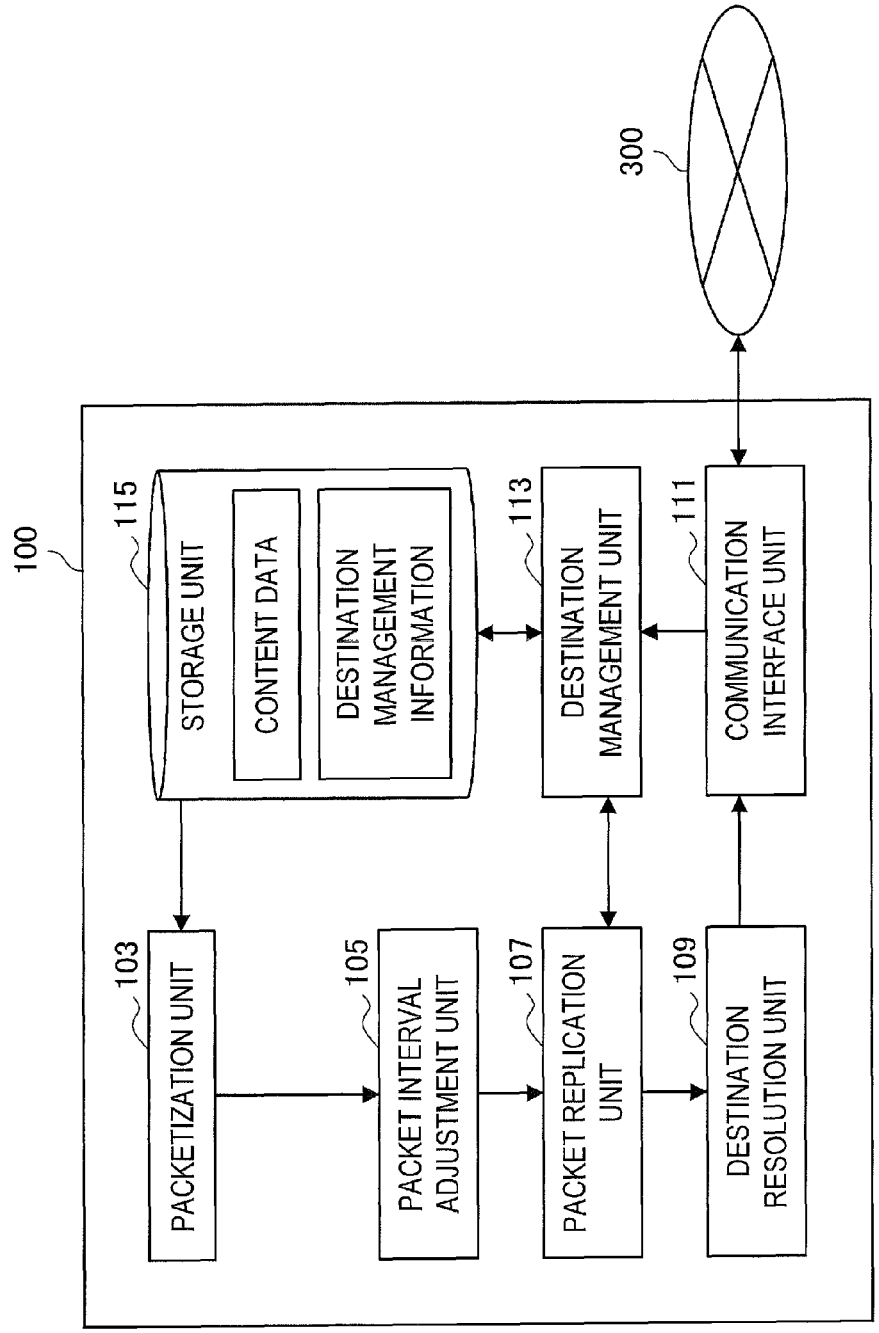
FIG. 6 is a block diagram showing a functional configuration of the information processing device according to the embodiment.
Figure 7:
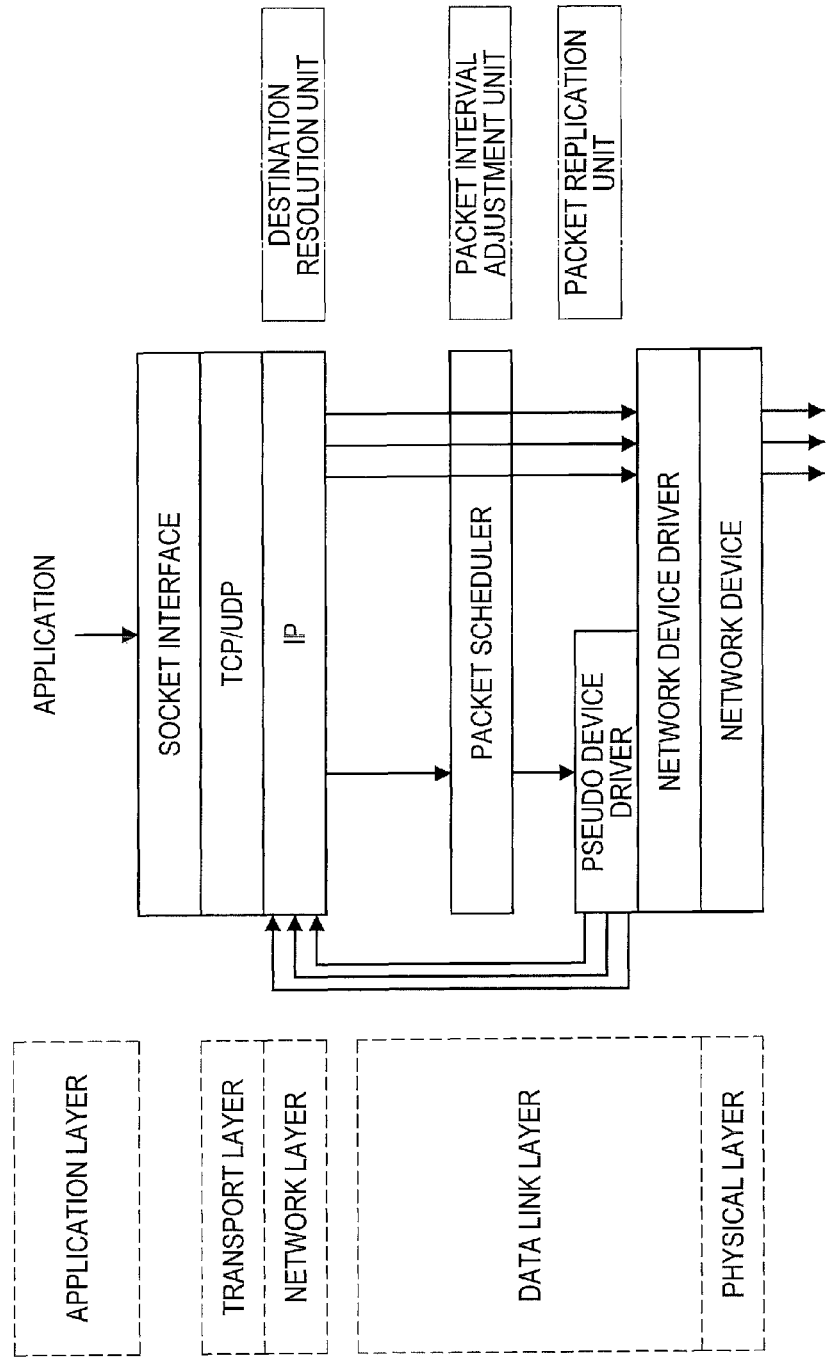
FIG. 7 is an illustrative diagram showing a network layer structure of the information processing device according to the embodiment.

Note that, referring to FIG. 7, a network layer structure of the distribution server 100 according to the present embodiment is shown. As shown herein, the function of the packet interval adjustment unit 105 shown in FIG. 6 can actually be implemented using an existing packet schedule. In addition, the packet replication unit 107 can be implemented with the function of a pseudo device drive.

After replicating packets, the pseudo device driver that functions as the packet replication unit 107 returns the replicated packets to a network layer. Accordingly, it is possible to transfer each packet to the communication interface according to each of destinations by using an existing routing function of the network layer functioning as the destination resolution unit 113.

Herein, a network layer structure of the distribution server 900 of the related art is shown in FIG. 16 for comparison. In the related art, for each of a plurality of flows replicated in an application layer, destination resolution is performed in a network layer, and packet intervals are adjusted by a packet scheduler so as to be transferred to a network device.

[1-3. Packet Transfer Operation]

Figure 8:
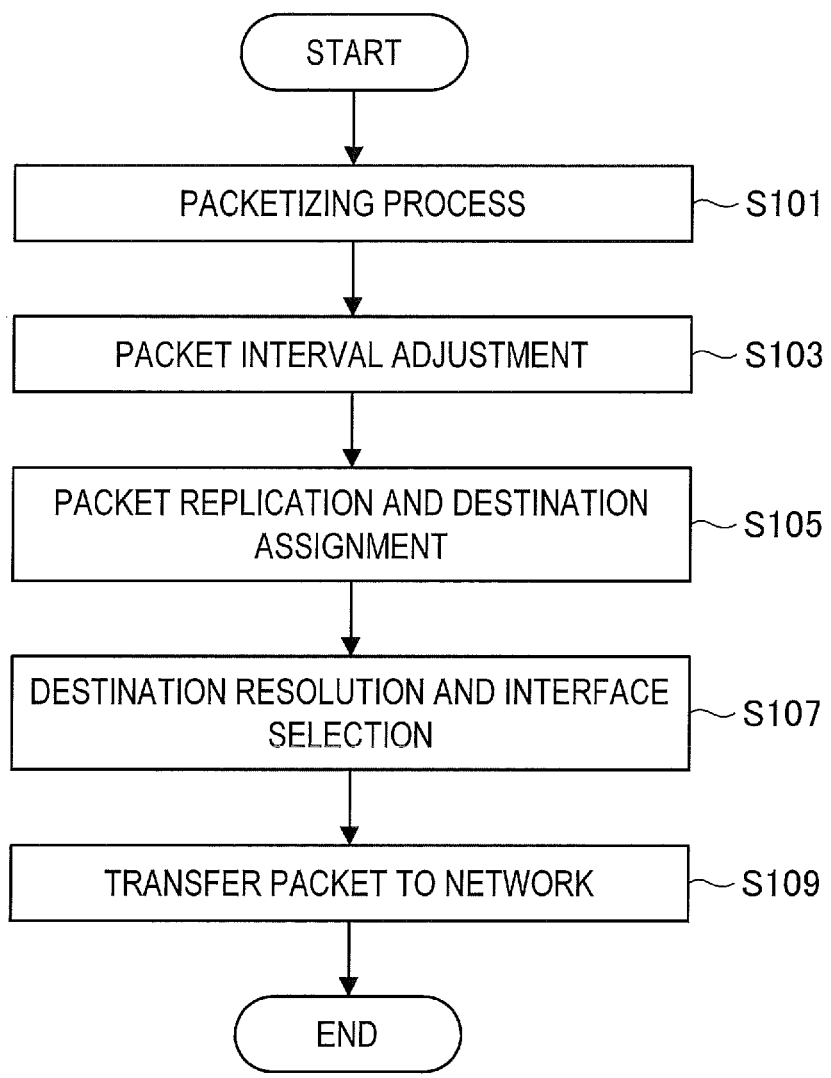
FIG. 8 is a flowchart describing an example of an operation of the information processing device according to the embodiment.

Next, an operation of packet transfer by the distribution server 100 according to the present embodiment will be described with reference to FIG. 8.

First, the packetization unit 103 of the distribution server 100 acquires content data from the storage unit 115, divides the content data, and then performs a packetizing process (S101). The packetization unit 103 inputs packets of the packetized content data to the packet interval adjustment unit 105. The packet interval adjustment unit 105 adjusts transmission intervals of the input packets (S103). The packet interval adjustment unit 105 inputs the packets whose transmission intervals have been adjusted to the packet replication unit 107.

The packet replication unit 107 replicates packets in the order managed by the destination management unit 113 for each of the input packets. Then, the packet replication unit 107 gives each destination information pieces to packets including the original packets that are the replication sources and the replicated packets (S105). The packet replication unit 107 inputs the packets to which the destination information pieces are given to the destination resolution unit 109.

The destination resolution unit 109 selects the communication interface unit 111 for transferring the packets to the network 300 according to each of the destination information pieces of the input packets (S107). Then, the destination resolution unit 109 sends each of the packets to the selected communication interface unit 111, and the communication interface unit 111 that has received the packets sends the packets to the network 300 (S109).

Hereinabove, the operation of the packet transfer of the content data by the distribution server 100 has been described. In tandem with the packet transfer process described herein, a process of editing the destination information pieces may actually be performed. The process of editing the destination information pieces is appropriately performed at timings at which requests to add or delete the destination information pieces are recognized.

[1-4. Destination Management]

Figure 11:
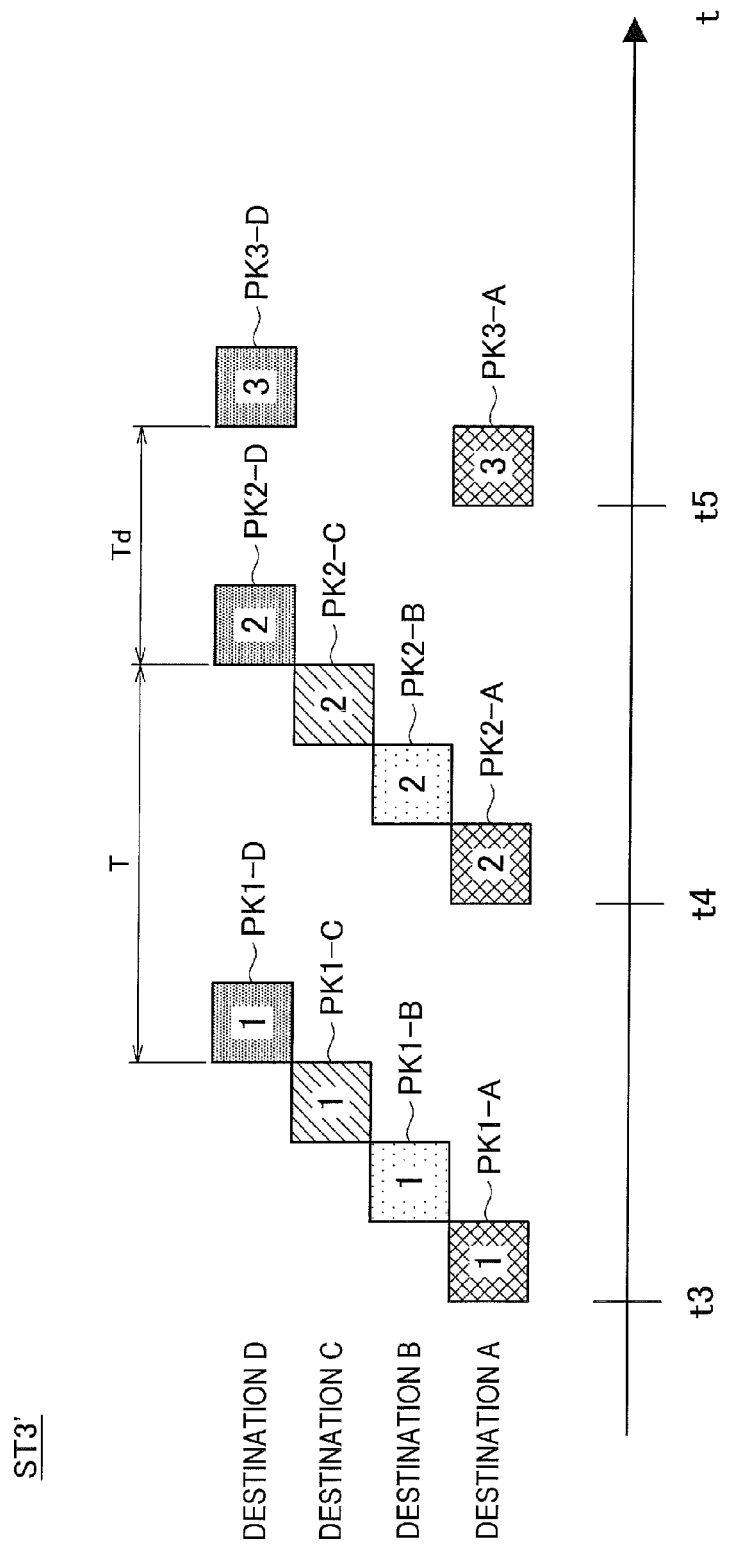
FIG. 11 is an illustrative diagram showing an example of packet intervals when the destination management information changes from the state of FIG. 9 to the state of FIG. 10.

Herein, details of destination management by the destination management unit 113 will be described next with reference to FIGS. 9 to 11. FIGS. 9 and 10 are tables showing examples of destination management information managed by the destination management unit 113. FIG. 11 is an illustrative diagram showing deletion of destination information.

Referring to FIG. 9, an example of destination management information retained by the destination management unit 113 is shown. In order to facilitate description herein, the destination management information is indicated by a list including numbers indicating an order of destinations and destination information for identifying destinations, but it is not limited thereto. The destination management information may be a list on which destination information pieces, for example, IP addresses are merely enumerated. In this case, the enumeration order on the list is the order that the packet replication unit 107 gives to the destination information pieces.

As shown in FIG. 9, destination information pieces are managed in order of the destinations A, B, C, and D, and when there is no change in the managed destination information pieces, packets are output from the packet replication unit 107 in the state shown in FIG. 5. In this case, the intervals between packets PK1-D, PK2-D, and PK3-D included in a series of packets output to the same destination i.e. a series of packets transferred to the destination D are fixed (T). This time interval T is substantially the same as the intervals between original packets of PK1-A, PK2-A, and PK3-A. Similarly, the packet intervals of packets included in packet groups transferred to the destinations B and C are also almost T.

With regard to this, when the destination information pieces are in the state shown in FIG. 10 after a replication process of the packets PK1 and PK2 is performed using the destination information pieces shown in FIG. 9, and a deletion process of destination information pieces before a replication process of the packet PK3 is started, the packets are output from the packet replication unit 107 in the state shown in FIG. 11. At this moment, the interval between the packets PK1 and PK2 is the same T as in FIG. 5. However, if destination information pieces of the destinations B and C are deleted during the time from the start of the replication process of the packet PK2 to the start of the replication process of the packet PK3, a transfer timing of the packet PK3 to the destination D becomes fast, and in the series of packets to be transferred to the destination D, the time interval Td between packets PK2-D and PK3-D becomes shorter than the time interval T between packets PK1-D and PK2-D.

At this moment, if a change (T−Td) in the transmission intervals between each of the packets included in the packet groups is shorter than or equal to a predetermined time length to be included in an allowable range, there is no influence on communication. However, if the change in the transmission intervals exceeds the predetermined time length that is an allowable value, discarding of packets occurs. For this reason, when a destination information piece is to be deleted, it is desirable for the destination management unit 113 to perform a deletion process so that a change in the intervals of each packet included in packet groups transferred to the same destination becomes shorter than or equal to a predetermined time length.

For example, the destination management unit 113 may perform a deletion process so that the number of destination information pieces to be deleted within the period of a replication process of the same packet, i.e. from the time when the packet replication unit 107 decides the number of replications for a packet and refers to destination management information for giving a destination information piece to the time when the packet replication unit refers to the destination management information for the next packet, for example, within the period from t4 to t5 in FIG. 11 is smaller than or equal to a predetermined number. An optimum value of this predetermined number is different depending on a configuration of the network 300. In addition, when destination information pieces are managed in the order of the destinations A, B, C, and D, for example, if the destination B is deleted, a change in the transmission interval between packets for the destinations C and D is made. When the destination C is deleted, however, even if one destination is deleted in the same manner, the deletion affects only the transmission interval between packets for the destination D. For this reason, it is preferable for the destination management unit 113 to delete, among destination information pieces to be deleted, a destination information piece in order from the destination information pieces managed by the destination management unit 113, which are close to the end thereof.

In addition, the packet replication unit 107 may insert a dummy packet into a spot corresponding to a packet generated when a destination information piece to be deleted is not deleted. In this case, the packet replication unit 107 can reduce a change in the packet interval between each packet included in a packet group transferred to the same destination by gradually reducing the size of the dummy packet and finally delete the packet.

In addition, it is desirable for the packet replication unit 107 to add a destination information piece to the end of destination management information when the destination information piece is to be added. This is for the same reason as in the case of deletion, and because, when a destination information piece is inserted in the middle of a list, the interval of packets for a destination indicated by destination information pieces after the inserted spot changes.

[1-5. Example of Effect]

As described above, the distribution server 100 according to the present embodiment performs a traffic shaping process, i.e., a replication process of packets after the packet interval is adjusted. According to this configuration, in a packet transmission control device that distributes the same data to a plurality of destinations, after the packet intervals between a plurality of packets included in one packet group are adjusted, each of the packets is replicated. Since the time taken for replication is generally shorter than the time for a transfer process, replicated packets are transferred in connection with original packets that are replication sources. For this reason, the replicated packets are transferred at the same interval as the original packets. Thus, in the packet transmission control device that distributes the same data to a plurality of destinations, the packet intervals of replicated packets can be adjusted only by performing one traffic shaping process for original packets. In the related art, since it is necessary to perform traffic shaping processes for each of replicated packets, the traffic shaping processes corresponding to the number of destination terminals 200 are performed, which causes a heavy processing load on the distribution server 100, but in comparison to this, it is possible to dramatically reduce a processing load caused by a packet interval adjustment process.

As an example, FIG. 12 shows a test result for confirming effectiveness of the distribution server 100 according to the present embodiment. FIG. 12 is a table showing the effectiveness confirmation test result of an information process according to the present embodiment. In the present test, the distribution server 100 and the destination terminals 220 of the use are as follows.

Distribution server 100: SUPERMICRO X7SLA-H (Atom330, 1.6 GHz, 2 GB of memory capacity)

Destination terminal 200: Intel D945GCLF2 (Atom330, 1.6 GHz, 2 GB of memory capacity)

A CPU load when each service of flows of 4 Mbps is provided in 50 flows, 100 flows, 150 flows, and 200 flows under the above described test environment is shown in FIG. 12. In the related art, when traffic shaping processes are performed for each flow, 75.93% of a CPU load is imposed in 150 flows, and accordingly, 4 Mbps is not maintained. On the other hand, when the distribution server 100 according to the present embodiment is used, a service can be provided with 15.50% of a processing load even in 200 flows.

As a result of continuing the test by further increasing the number of flows in the configuration of the distribution server 100 according to the present embodiment in addition to the test conditions shown in FIG. 12, 4 Mbps is not maintained in 220 flows, but there remains a room in the CPU load. For this reason, the network is considered to have reached its limit.

In other words, according to a method of the related art, the CPU of the distribution server has reached its limit before the network reaches its limit. However, in the configuration of the distribution server 100 according to the present embodiment, it is possible to dramatically reduce a CPU load caused by a traffic shaping process. For this reason, the distribution server 100 can provide content distribution service to even more destinations using the same hardware resources.

2. Second Embodiment (Multi-Stage Configuration)

Note that, in the first embodiment, the example in which content data is distributed from the distribution server 100 directly to the destination terminals 200 is described, but the technology is not limited to the example. For example, it is also possible to adopt a multi-stage configuration of the distribution server 100 as shown in FIG. 13.

Figure 13:
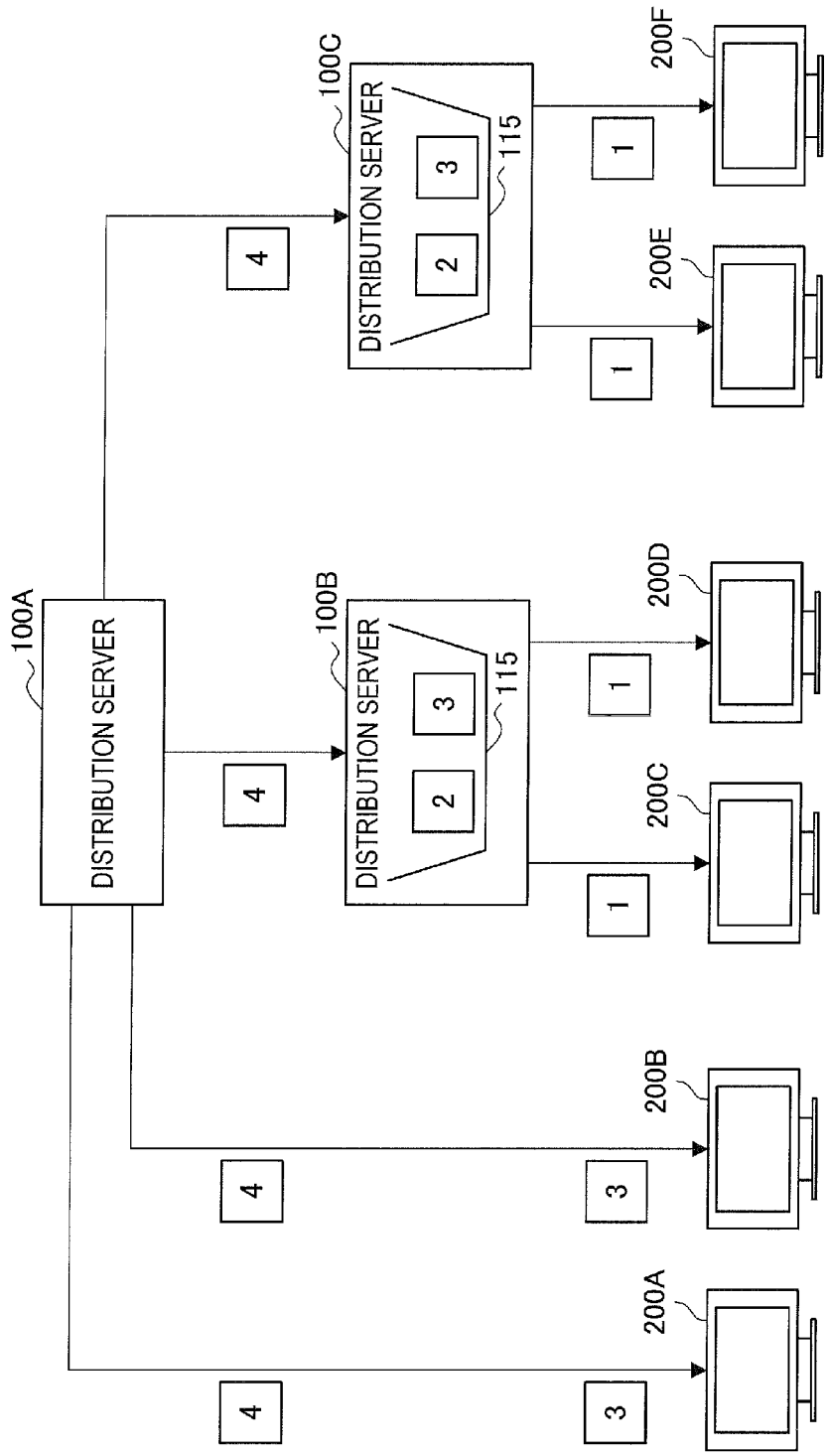
FIG. 13 is a configuration diagram showing an information processing system according to a second embodiment of the present disclosure.

In the distribution system shown in FIG. 13, a distribution server 100A sends packets to a destination terminal 200A, a destination terminal 200B, a distribution server 100B, and a distribution server 100C. At this moment, the distribution server 100B and the distribution server 100C may perform, for example, buffering so as not to propagate an influence of jitter of a network to the latter stage.

Note that the configuration of the distribution server 100B and the distribution server 100C is basically the same as that of the distribution server 100 described in FIG. 6. Differences are that each packet received via the communication interface unit 111 is temporarily stored in the storage unit 115 functioning as a buffer, and that the packet interval adjustment unit 105 acquires each packet from the storage unit 115 so as to adjust the transmission intervals.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present invention.

For example, in the above-described embodiments, destination information of a distribution destination is set to be managed as a destination list, but the technology is not limited to the example. There is no limit on the type of management as long as destination management information includes information for identifying destinations, and information of order of assigning the destinations by a destination assignment unit.

In addition, in the present specification, the steps described in the flowchart include a process performed in time series following the described order, and also include a process executed in parallel or in an individual manner, even if it is not necessarily processed in time series. In addition, it is needless to say that even the order of steps processed in time series can be appropriately changed depending on cases.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

REFERENCE SIGNS LIST

100 Distribution server
103 Packetization unit
105 Packet interval adjustment unit
107 Packet replication unit
109 Destination resolution unit
111 Communication interface unit
113 Destination management unit
115 Storage unit
200 Destination terminal
300 Network

The invention claimed is:

1. A packet transmission control device comprising:
   a packet interval adjustment unit that adjusts packet intervals of a plurality of packets;
   a packet replication unit that replicates the plurality of packets whose packet intervals are adjusted by the packet interval adjustment unit to generate a plurality of packet groups; and
   a destination assignment unit that assigns different destination information pieces to respective plurality of packet groups generated by the packet replication unit,
   wherein the different destination information pieces are assigned to the plurality of packet groups in an order of being described in destination management information in which the destination information pieces are described.

2. The packet transmission control device according to claim 1, further comprising:

a destination management unit that retains the destination management information in which the destination information pieces are described in order of being assigned to the plurality of packet groups, wherein the packet replication unit replicates a number of packet groups corresponding to a number of destination information pieces described in the destination management information retained by the destination management unit.

3. The packet transmission control device according to claim 2, wherein the destination management unit limits the number of destination information pieces that are deleted to be lower than or equal to a predetermined number in accordance with a deletion request for the destination information pieces described in the destination management information.

4. The packet transmission control device according to claim 3, wherein the destination management unit deletes the destination information pieces in order of being described closer to an end of the destination management information.

5. The packet transmission control device according to claim 2, wherein the destination management unit adds a destination information piece to an end of the destination management information in accordance with an addition request of the destination information piece to the destination management information.

6. The packet transmission control device according to claim 1, further comprising:
a destination resolution unit that decides a communication interface that sends the plurality of packets based on the different destination information pieces assigned to the plurality of packets by the destination assignment unit.

7. The packet transmission control device according to claim 1, further comprising:
a reception unit that receives the plurality of packets via a network; and
a buffer unit that temporarily stores the plurality of packets received by the reception unit, wherein the packet interval adjustment unit adjusts packet intervals of the plurality of packets acquired from the buffer unit.

8. A packet transmission control method comprising:
adjusting packet intervals of a plurality of packets;
replicating the plurality of packets whose packet intervals are adjusted to generate a plurality of packet groups; and
assigning different destination information pieces to respective plurality of packet groups,
wherein the different destination information pieces are assigned to the plurality of packet groups in an order of being described in destination management information in which the destination information pieces are described.

9. A non-transitory computer-readable storage medium having stored thereon, a computer program having at least one code section, the at least one code section being executable by a computer for causing said computer to perform steps comprising:
replicating a plurality of packets whose packet intervals are adjusted in advance to generate a plurality of packet groups; and
assigning different destination information pieces to respective plurality of packet groups generated by the packet replication unit,
wherein the different destination information pieces are assigned to the plurality of packet groups in an order of being described in destination management information in which the destination information pieces are described.

10. A packet transmission control device, comprising:
a packet interval adjustment unit configured to adjust packet intervals of a plurality of packets;
a packet replication unit configured to replicate the plurality of packets whose packet intervals are adjusted by the packet interval adjustment unit to generate a plurality of packet groups;
a destination assignment unit configured to assign different destination information pieces to respective plurality of packet groups generated by the packet replication unit; and
a destination management unit configured to retain destination management information in which destination information pieces are described, by the destination assignment unit, in order of being assigned to the plurality of packet groups,
wherein the packet replication unit replicates a number of packet groups corresponding to a number of destination information pieces described in the destination management information retained by the destination management unit, and
wherein the destination assignment unit assigns, to the plurality of packet groups, the destination information pieces described in the destination management information in order of being described in the destination management information.

* * * * *